US011108134B2

(12) United States Patent
Daigo

(10) Patent No.: US 11,108,134 B2
(45) Date of Patent: Aug. 31, 2021

(54) WIRELESS COMMUNICATION DEVICE AND METHOD CARRIED OUT BY WIRELESS COMMUNICATION DEVICE

(71) Applicant: Ricoh Company, Ltd., Tokyo (JP)

(72) Inventor: Kenji Daigo, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/871,603

(22) Filed: May 11, 2020

(65) Prior Publication Data
US 2020/0388905 A1 Dec. 10, 2020

(30) Foreign Application Priority Data
Jun. 6, 2019 (JP) .............................. JP2019-106187

(51) Int. Cl.
*H01Q 1/24* (2006.01)
*H04B 1/3888* (2015.01)

(52) U.S. Cl.
CPC ........... *H01Q 1/243* (2013.01); *H04B 1/3888* (2013.01)

(58) Field of Classification Search
CPC combination set(s) only.
See application file for complete search history.

(56) References Cited

U.S. PATENT DOCUMENTS

| 2010/0240327 | A1* | 9/2010 | Lambrecht | H01Q 1/243 455/95 |
| 2011/0293260 | A1 | 12/2011 | Daigo | |
| 2012/0300051 | A1 | 11/2012 | Daigo et al. | |
| 2017/0207530 | A1* | 7/2017 | Anderson | H01Q 1/2291 |
| 2017/0324147 | A1* | 11/2017 | Lee | H01Q 7/00 |
| 2018/0069301 | A1* | 3/2018 | Choi | H01Q 3/247 |
| 2018/0076507 | A1* | 3/2018 | Heo | H01Q 5/321 |
| 2018/0259778 | A1* | 9/2018 | Pu | H01Q 21/29 |
| 2020/0212547 | A1* | 7/2020 | Huh | H01Q 21/29 |
| 2020/0313725 | A1* | 10/2020 | Abdulai | H04B 5/0031 |

FOREIGN PATENT DOCUMENTS

| JP | 7-106819 | 4/1995 |
| JP | 2007-006023 | 1/2007 |
| JP | 2015-186056 | 10/2015 |

* cited by examiner

Primary Examiner — Junpeng Chen
(74) Attorney, Agent, or Firm — Xsensus LLP

(57) ABSTRACT

A wireless communication device and a method carried out by the wireless communication device. The wireless communication device includes a housing configured to hold a wireless communication controller, a first antenna disposed inside the housing and coupled to the wireless communication controller, the first antenna having low electric field intensity in some of directions departing from the wireless communication device due to attenuation or blockage of radio wave by the housing, and a second antenna coupled to the wireless communication controller. The second antenna has higher electric field intensity than the first antenna in a strength-declining direction where the first antenna has lowest electric field intensity. The method includes exchanging a radio wave with an external device using both the first antenna and the second antenna, and the first antenna and the second antenna is controlled by the wireless communication controller.

11 Claims, 4 Drawing Sheets

WIRELESS COMMUNICATION DEVICE AND METHOD CARRIED OUT BY WIRELESS COMMUNICATION DEVICE

CROSS-REFERENCE TO RELATED APPLICATION

This patent application is based on and claims priority pursuant to 35 U.S.C. § 119(a) to Japanese Patent Application No. 2019-106187, filed on Jun. 6, 2019, in the Japan Patent Office, the entire disclosure of which is hereby incorporated by reference herein.

BACKGROUND

Technical Field

Embodiments of the present disclosure relate to a wireless communication device and a method executed by the wireless communication device.

Background Art

Wireless communication devices that can perform radio communication with an external device are known in the art. For example, some digital single-lens reflex (SLR) cameras are known in the art as an example of wireless communication device.

Such digital SLR cameras have a housing made of metal, and an antenna for wireless communication is disposed inside the metal housing. In such a housing made of metal, an opening is formed near the position at which the antenna is disposed. Such an opening is covered with a rubber grip. As an opening is formed near the position at which the antenna is disposed, the radio wave of the antenna is easily radiated to the surrounding area of the metal housing (i.e., the surrounding area of a digital SLR camera), and the electric field intensity of the antenna improves.

SUMMARY

Embodiments of the present disclosure described herein provide a wireless communication device and a method carried out by the wireless communication device. The wireless communication device includes a housing configured to hold a wireless communication controller, a first antenna disposed inside the housing and coupled to the wireless communication controller, the first antenna having low electric field intensity in some of directions departing from the wireless communication device due to attenuation or blockage of radio wave by the housing, and a second antenna coupled to the wireless communication controller. The second antenna has higher electric field intensity than the first antenna in a strength-declining direction where the first antenna has lowest electric field intensity. The method includes exchanging a radio wave with an external device using both the first antenna and the second antenna, and the first antenna and the second antenna is controlled by the wireless communication controller.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

Figure 1:
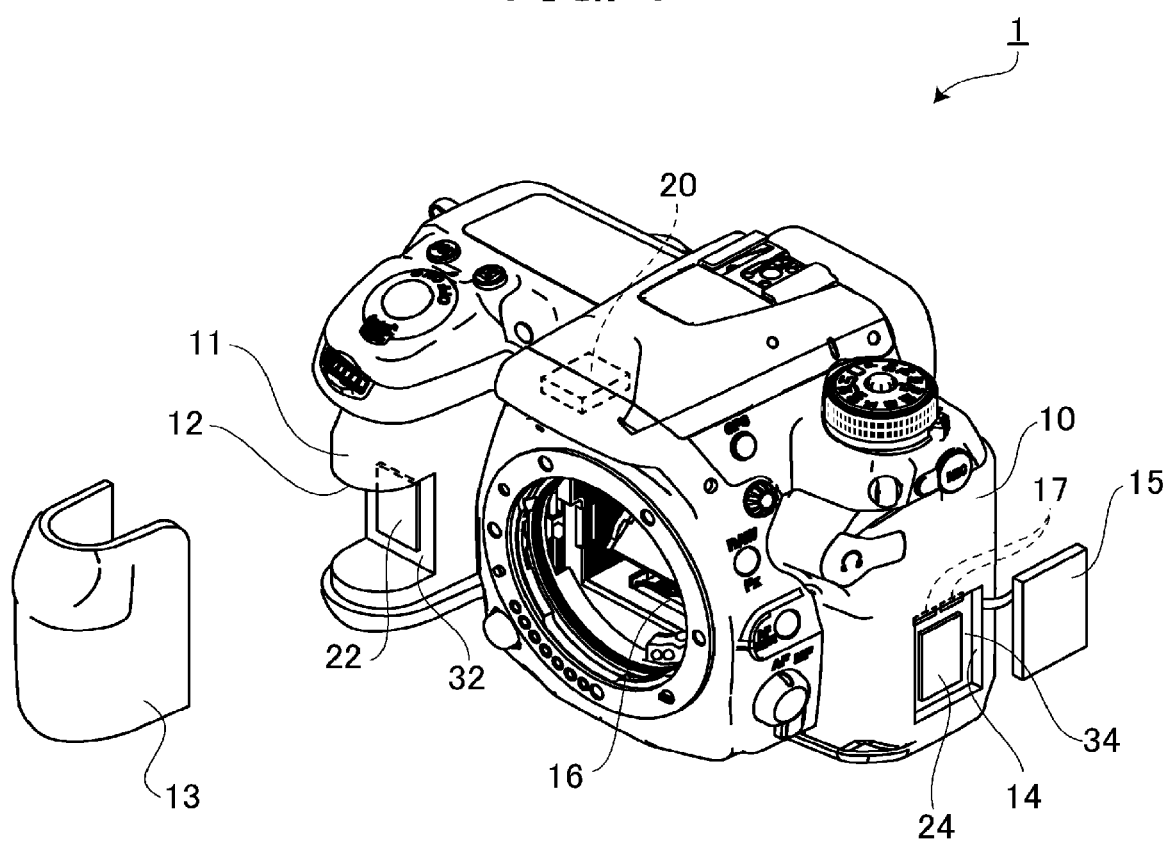
FIG. 1 is a perspective view of an imaging device according to embodiments of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

A wireless communication device according to embodiments of the present disclosure is described below with reference to the drawings. In the following description, an imaging device that serves as an example of a wireless communication device is described.

FIG. 1 is a perspective view of an imaging device 1 according to embodiments of the present disclosure.

In the present embodiment, the imaging device 1 is a digital single-lens reflex camera. However, the imaging device 1 is not limited to a digital single-lens reflex camera, but may be other kinds of device with wireless-communication capability such as a mirrorless interchangeable-lens camera, a compact digital camera, a printer, a digital video camera, a laptop personal computer (PC), a tablet PC, A personal handy-phone system (PHS), a smartphone, a feature phone, a game machine.

As illustrated in FIG. 1, the imaging device 1 includes a housing 10. In the present embodiment, the housing 10 is a housing made of metal such as magnesium alloy. Note also that the housing 10 may be a housing where electrically-conductive coating is applied to a housing made of resin. Alternatively, the housing 10 may be a housing to which metallic paint including metal powder is applied. In other words, in the present embodiment, the housing 10 is configured to have a high level of radio-shielding capability.

Figure 3:
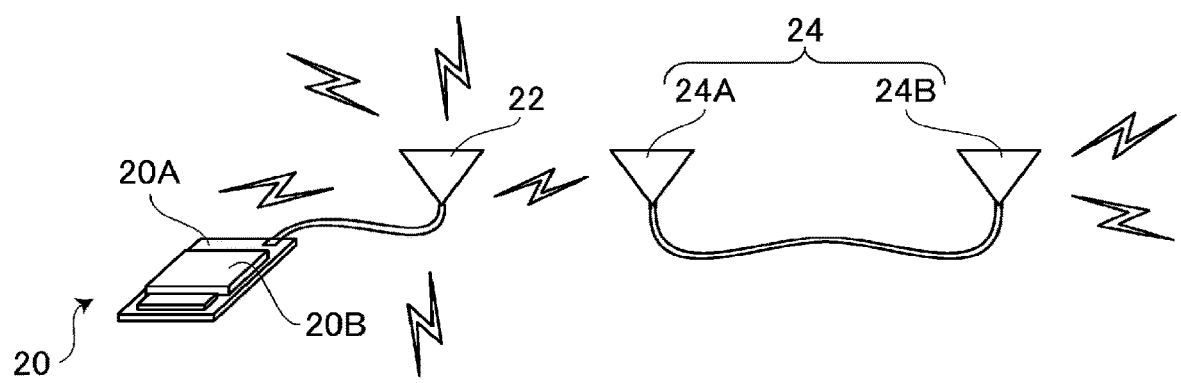
FIG. 3 is a schematic diagram illustrating a configuration of a wireless communication module and a pair of antennas provided for an imaging device, according to a first embodiment of the present disclosure.

A wireless communication module 20, which is an example of a wireless communication controller used by the imaging device 1 to performs radio communication with an external device, is held inside the housing 10. For example, as illustrated in FIG. 3, the wireless communication module 20 has a wireless-communication integrated circuit (IC) 20B mounted on a circuit board 20A such as a flexible printed circuits (FPC) and a printed circuit board (PCB).

Antennas 22 and 24 are coupled to the wireless communication module 20. The antennas 22 and 24 are nondirectional antennas, and can transmit and receive a radio wave pursuant to at least one wireless communication standard including, for example, wireless fidelity (Wi-Fi), Bluetooth (registered trademark), near-field communication (NFC). For example, the wireless communication module 20 is coupled to the antenna 22 and the antenna 24 through a coaxial cable where the impedance is controlled to 50 ohms (Ω).

Inside the housing 10, holding members 32 and 34 that are made of resin are held. Inside the housing 10, the antenna 22 is attached to the holding member 32, and the antenna 24 is attached to the holding member 34. In other words, the antennas 22 and 24 are installed in the housing 10.

The antennas 22 and 24 are antenna patterns that are printed on a substrate. Note also that each of the antennas 22 and 24 may be replaced with a chip antenna that is implemented on a substrate, and may be replaced with antenna patterns that are printed on a resin component provided inside the housing 10. When the housing 10 is made based on a molded resin product, such a resin component may be equivalent to the housing 10 in its entirety.

The wireless communication module 20 and the antennas 22 and 24 may be mounted on the same circuit board, or may separately be mounted on different circuit boards. The wireless communication module 20 and the antennas 22 and 24 may be coupled to each other through a wiring pattern on a circuit board instead of a coaxial cable. Each connecting portion between the wireless communication module 20 and the antennas 22 and 24 may be implemented by a solder joint or connector. Alternatively, the wireless communication module 20 and the antennas 22 and 24 may be coupled to each other using any other known methods.

For example, the wireless communication module 20 and the antennas 22 and 24 may directly be coupled to each other without a joining member such as a coaxial cable.

A projecting part 11 is formed on the housing 10. An opening 12 is formed on the projecting part 11. A grip 13 that is made of rubber is fitted to the projecting part 11, and is fixed by, for example, adhesion. A user holds the imaging device 1 by holding the grip 13. As described above, the opening 12 is covered with the grip 13, and cannot visually be recognized in appearance.

An antenna 22 is disposed near the opening 12, and is at a position where it is viewable through the opening 12 when the grip 13 is taken out.

An opening 14 is formed on the housing 10. The housing 10 has an electronic connection terminal 17 such as a universal serial bus (USB) port and a charging port near the opening 14. For example, when a user wishes to connect the imaging device 1 to another device through an USB port, he or she opens a cover 15 made of rubber, and connects a USB cable to the USB port. Basically, the opening 14 is covered with the cover 15. The cover 15 is taken out only when it is necessity to do so.

An antenna 24 is disposed near the opening 14, and is at a position where it is viewable through the opening 14 when the cover 15 is taken out.

In the imaging device 1, the antennas 22 and 24 directly transmit and radiate a radio wave from the openings 12 and 14 and other openings on the housing 10 (for example, an opening 16 at a mounting unit) to the surrounding area of the imaging device 1. Even the radio wave that is blocked by the housing 10 goes outside the housing 10 by diffraction or is reflected inside the housing 10, and then is radiated from the openings 12, 14, 16, or the like to the surrounding area of the imaging device 1. More specifically, the radio waves that have passed through the openings 12 and 14 are radiated to the surrounding area of the imaging device 1 through the grip 13 and the cover 15, respectively. The grip 13 and the cover 15 are made of rubber through which a radio wave can easily pass.

In the imaging device 1, the opening 12 is formed near the position at which the antenna 22 is disposed. Due to this configuration, the radio wave of the antenna 22 can easily be radiated to the surrounding area of the imaging device 1, and the electric field intensity of the antenna 22 around the imaging device 1 improves.

Figure 2:
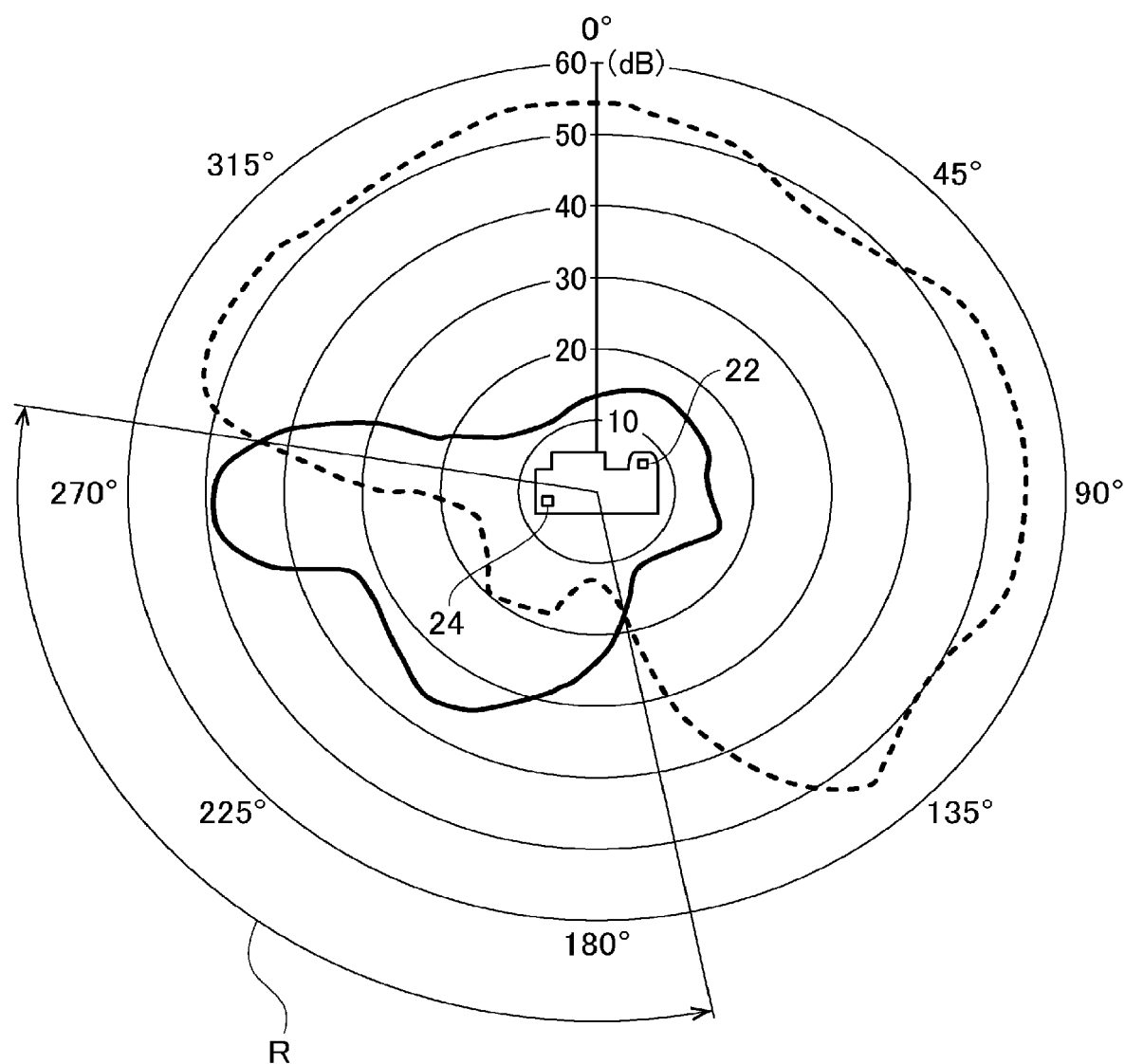
FIG. 2 is a diagram illustrating radiation patterns of a pair of antennas provided for an imaging device in the horizontal directions, according to embodiments of the present disclosure.

FIG. 2 is a diagram illustrating radiation patterns of the antennas 22 and 24 in the horizontal directions, according to the present embodiment.

In FIG. 2, the broken line indicates the radiation pattern of the antenna 22, and the solid line indicates the radiation pattern of the antenna 24.

As illustrated in FIG. 2, in the imaging device 1, the antenna 22 is disposed inside the housing 10 that has a high level of radio-shielding capability. The radio wave of the antenna 22 directly reaches the omnidirectional area around the imaging device 1 through the openings 12, 14, and 16 or the like. Alternatively, the radio wave of the antenna 22 is radiated outside the housing 10 after diffraction or reflection and then reaches the omnidirectional area around the imaging device 1. However, the electric field intensity of the antenna 22 gets low in some of the directions departing from the imaging device 1, where, for example, it is difficult for a diffracted wave to travel and only a radio wave whose strength is lost due to reflection can travel. In other words, the electric field intensity of the antenna 22 gets low in some of the directions departing from the imaging device 1, due to the attenuation or blockage of radio wave by the housing 10.

In the example as illustrated in FIG. 2, it is difficult for the antenna 22 of the imaging device 1 to communicate with an external device that is located away from the imaging device 1 in directions R where the electric field intensity of the antenna 22 gets low. Note also that the directions R include a strength-declining direction where the electric field intensity of the antenna 22 becomes the lowest in all the directions departing from the imaging device 1.

In the present embodiment, the antenna 24 is arranged such that the imaging device 1 does not have difficulty in performing radio communication with an external device in the directions R. More specifically, the antenna 24 is arranged in view of, for example, the position and specifications such that the electric field intensity of the antenna 24 in the directions R will be higher than that of the antenna 22.

As described above, according to the present embodiment, the antenna 24 is disposed near the cover 15 that is made of rubber and protects the connection terminal 17 (and the opening 14). Due to this configuration, the radio wave that is radiated from the antenna 24 passes through, for example, the opening 14 and the cover 15, and is radiated to an area including some of the area in the directions R. As a result, as illustrated in FIG. 2, the antenna 24 has higher electric field intensity in the directions R than the antenna 22.

As described above, the antenna 24 interpolates an area around the imaging device 1 in which the electric field intensity of the antenna 22 is low. In other words, the antenna 24 has higher electric field intensity in such an area than the antenna 22. In the present embodiment, the antenna 24 is arranged that interpolates an area in which the electric field intensity of the antenna 22 is low, and thus the wireless communication module 20 can stably perform radio communication with an external device in the omnidirectional surrounding area of the imaging device 1.

Note also that the antenna 24 is satisfactory as long as its electric field intensity is higher than that of the antenna 22 in a strength-declining direction where the electric field intensity of the antenna 22 becomes the lowest. For this reason, the specifications of the antenna 24 may be lower than those of the antenna 22. It is not always necessary for the antenna 24 to be a nondirectional antenna but may an antenna with high directivity in the strength-declining direction.

More specific embodiments of the imaging device 1 according to the present embodiment are described below. More precisely, more specific embodiments of the wireless communication module 20 and the antennas 22 and 24 are described below.

First Embodiment

FIG. 3 is a schematic diagram illustrating a configuration of the wireless communication module 20 and the antennas 22 and 24, according to a first embodiment of the present disclosure.

A wireless-communication integrated circuit (IC) 20B is a chip used for wireless communication, and has a single antenna-specific terminal. The wireless-communication IC 20B is mounted on a circuit board 20A that is provided with a terminal 20C (see FIG. 6) coupled to that antenna-specific terminal. The antenna 22 is coupled to the wireless-communication IC 20B through the terminal 20C. The terminal 20C may be a land used for soldering which is formed on the circuit board 20A, or may be a connector implemented on the circuit board 20A. The configuration or structure that is described in this paragraph is in common with the first embodiment and the following embodiments of the present disclosure.

As illustrated in FIG. 3, the antenna 24 according to the first embodiment of the present disclosure includes a relay antenna 24A and an antenna 24B. The relay antenna 24A exchanges a radio wave with the antenna 22. The antenna 24B is coupled to the relay antenna 24A, and exchanges a radio wave with an external device.

In the first embodiment of the present disclosure, the antenna 24B is disposed near the opening 14. By contrast, the relay antenna 24A is not disposed near the opening 14, but is disposed at a position where the relay antenna 24A can reliably exchange a radio wave with the antenna 22. For example, the relay antenna 24A may be disposed near the antenna 22.

The relay antenna 24A and the antenna 24B are antenna patterns that are printed on a substrate. Note also that each of the relay antenna 24A and the antenna 24B may be replaced with a chip antenna that is implemented on a substrate, and may be replaced with antenna patterns that are printed on a resin component provided inside the housing 10.

For example, the relay antenna 24A and the antenna 24B are mounted on the same circuit board, and are coupled to each other through a wiring pattern on that circuit board. Alternatively, the relay antenna 24A and the antenna 24B may separately be mounted on different circuit boards. The relay antenna 24A and the antenna 24B may be coupled to each other through a coaxial cable instead of a wiring pattern on a circuit board. Each connecting portion of the relay antenna 24A and the antenna 24B may be implemented by a solder joint or connector. Alternatively, the relay antenna 24A and the antenna 24B may be coupled to each other using any other known methods.

Once a radio-frequency (RF) signal output from the wireless communication module 20 is received, the antenna 22 converts the received RF signal into a radio wave, and radiates the radio wave. The relay antenna 24A receives the radio wave that is radiated by the antenna 22 as a RF signal, and carries the received RF signal to the antenna 24B. The relay antenna 24B converts the RF signal carried by the relay antenna 24A into a radio wave, and radiates the radio wave. As described above, the antenna 24 communicates with the wireless communication module 20 through the antenna 22, and converts the RF signal, which is received from the antenna 22, into a radio wave, and radiates the radio wave.

Each one of the antenna 22 and the antenna 24B radiates the RF signal that is input from the wireless communication module 20 as a radio wave. Due to this configuration, the imaging device 1 can stably performs radio communication with an external device in the omnidirectional surrounding area.

Second Embodiment

Figure 4:
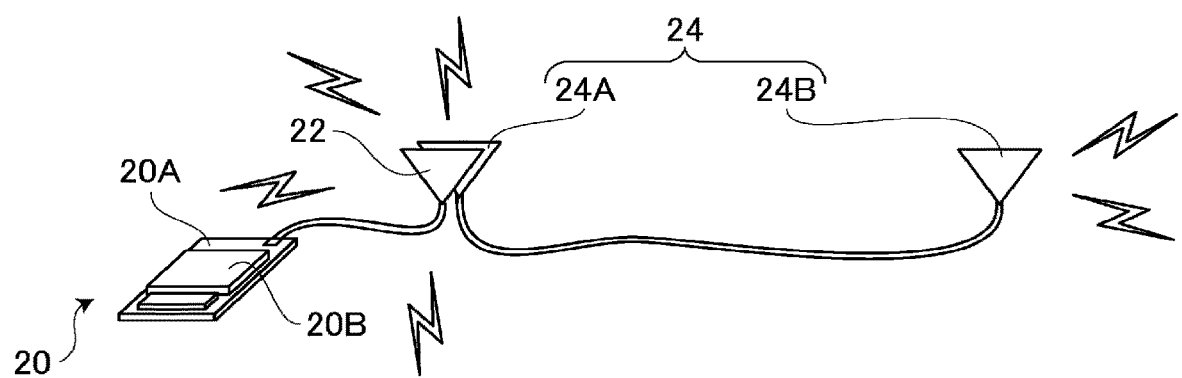
FIG. 4 is a schematic diagram illustrating a configuration of a wireless communication module and a pair of antennas provided for an imaging device, according to a second embodiment of the present disclosure.

FIG. 4 is a schematic diagram illustrating a configuration of the wireless communication module 20 and the antennas 22 and 24, according to a second embodiment of the present disclosure.

As illustrated in FIG. 4, the antenna 24 according to the second embodiment of the present disclosure are provided with the relay antenna 24A and the antenna 24B.

In the second embodiment and the following embodiments of the present disclosure, the description of configurations or structure that are equivalent to or similar to those described in the first embodiment may be simplified or omitted.

In the second embodiment of the present disclosure, the antenna 22 and the relay antenna 24A are disposed in an overlapping manner and are capacitively-coupled to each other. Due to this configuration, one of the antenna 22 and the relay antenna 24A can be synchronized with the other to establish resonance, and a radio-frequency (RF) signal can be transmitted between the antenna 22 and the relay antenna 24A. As a result, also in the second embodiment of the present disclosure, in a similar manner to the first embodiment of the present disclosure, each one of the antenna 22 and the antenna 24B radiates a radio wave, and the imaging device 1 can stably perform radio communication with an external device in the omnidirectional surrounding area.

Third Embodiment

Figure 5:
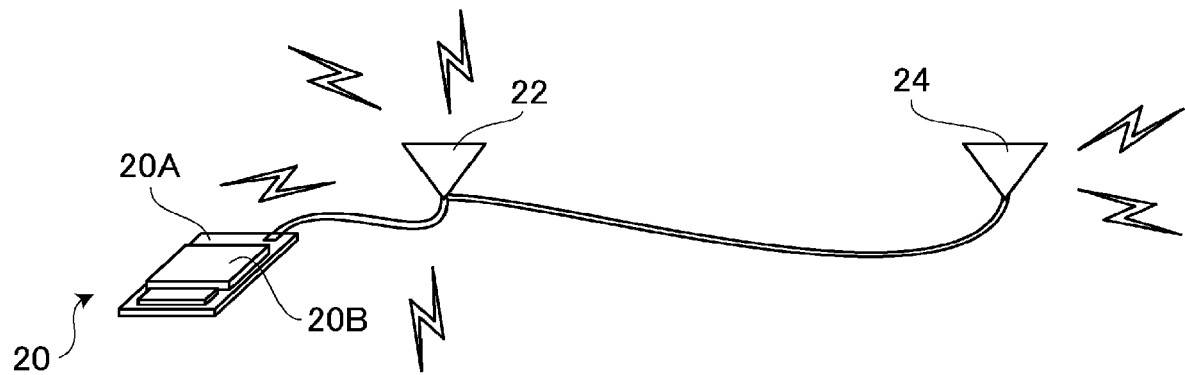
FIG. 5 is a schematic diagram illustrating a configuration of a wireless communication module and a pair of antennas provided for an imaging device, according to a third embodiment of the present disclosure.

FIG. 5 is a schematic diagram illustrating a configuration of the wireless communication module 20 and the antennas 22 and 24, according to a third embodiment of the present disclosure.

As illustrated in FIG. 5, the antenna 24 according to the third embodiment of the present disclosure is directly coupled to the antenna 22.

In the third embodiment of the present disclosure, for example, the antennas 22 and 24 are mounted on the same circuit board, and are coupled to each other through a wiring pattern on that circuit board. Alternatively, the antennas 22 and 24 may separately be mounted on different circuit boards. The conductive material that couples the antenna 22 to the antenna 24 is not limited to a wiring pattern on a circuit board, but may be a coaxial cable. Each connecting portion of the antenna 22 and the antenna 24 may be implemented by a solder joint or connector. Alternatively, the antenna 22 and the antenna 24 may be coupled to each other using any other known methods.

Due to this configuration, also in the third embodiment of the present disclosure, each one of the antenna 22 and the antenna 24B radiates a radio wave, and the imaging device 1 can stably performs radio communication with an external device in the omnidirectional surrounding area.

Fourth Embodiment

Figure 6:
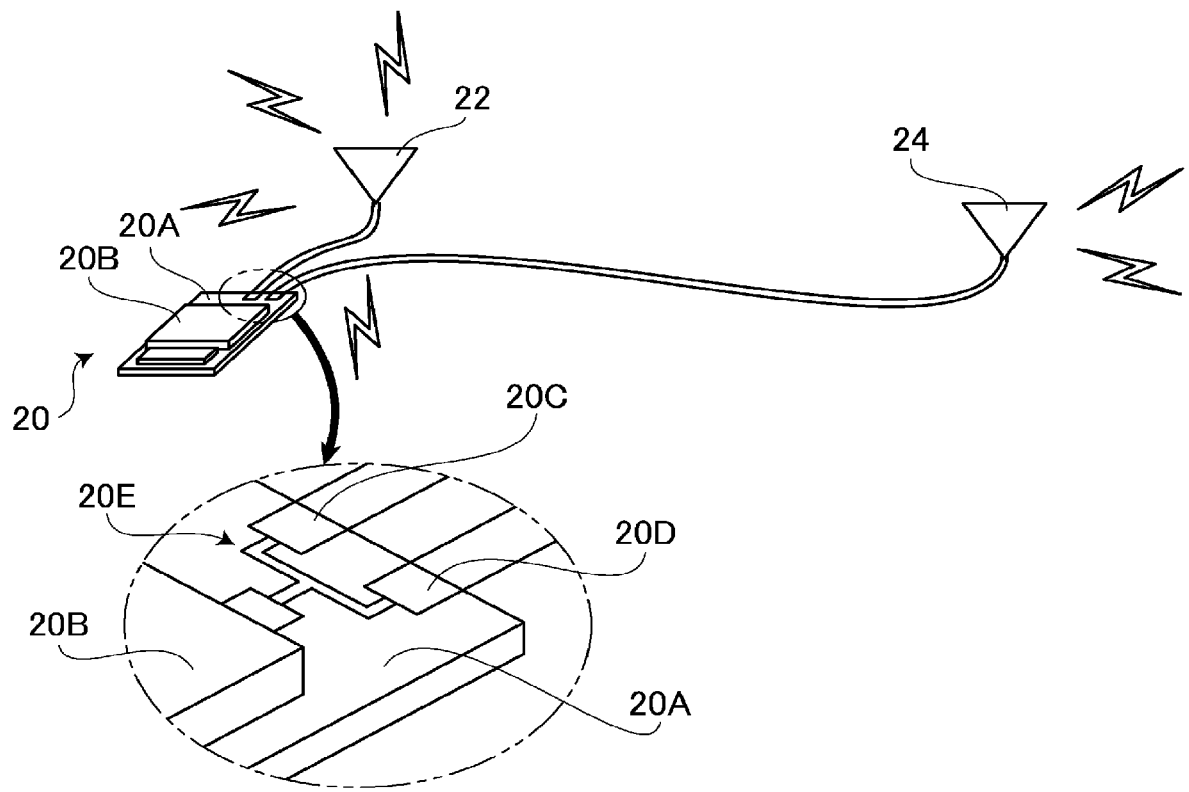
FIG. 6 is a schematic diagram illustrating a configuration of a wireless communication module and a pair of antennas provided for an imaging device, according to a fourth embodiment of the present disclosure.

FIG. 6 is a schematic diagram illustrating a configuration of the wireless communication module 20 and the antennas 22 and 24, according to a fourth embodiment of the present disclosure.

As illustrated in FIG. 6 as an enlarged view, a terminal 20D is provided for the circuit board 20A according to the fourth embodiment of the present disclosure. A pattern 20E, which is an example of a branch through which the antenna-specific terminal of the wireless-communication IC 20B diverges into two terminals, is formed on the circuit board 20A, and One of the diverged branches of the pattern 20E is coupled to the terminal 20C, and the other one of the diverged branches of the pattern 20E is coupled to the terminal 20D.

Due to this configuration, also in the fourth embodiment of the present disclosure, each one of the antenna 22 and the antenna 24B radiates a radio wave, and the imaging device 1 can stably performs radio communication with an external device in the omnidirectional surrounding area.

Note that numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

In the above embodiments of the present disclosure, a configuration or structure is described where a single antenna 24 is arranged in order to interpolate an area in which the electric field intensity of the antenna 22 is low. However, no limitation is indicated thereby, and a plurality of antennas 24 may be arranged without departing from the scope of the present disclosure. Such a plurality of antennas 24 may interpolate a single area in which the electric field intensity of the antenna 22 is low, Alternatively, each of such a plurality of antennas 24 may interpolate a different area in which the electric field intensity of the antenna 22 is low.

What is claimed is:

1. A wireless communication device, comprising:
a housing configured to hold a wireless communication controller;
a first antenna disposed inside the housing and coupled to the wireless communication controller, the first antenna having low electric field intensity in some of directions departing from the wireless communication device due to attenuation or blockage of radio wave by the housing; and
a second antenna disposed inside the housing and coupled to the wireless communication controller, the second antenna having higher electric field intensity than the first antenna in a strength-declining direction where the first antenna has a lowest electric field intensity, wherein the second antenna comprises a relay antenna configured to exchange a radio wave with the first antenna, and an antenna coupled to the relay antenna to exchange a radio wave with an external device.

2. The wireless communication device according to claim 1,
wherein the second antenna is coupled to the wireless communication controller through the first antenna.

3. The wireless communication device according to claim 1, wherein the strength-declining direction is a direction in which electric field intensity of the first antenna becomes lowest, from among all directions departing from the wireless communication device.

4. The wireless communication device according to claim 1, wherein the housing is made of metal.

5. The wireless communication device according to claim 1,
wherein the housing has a first opening formed near the first antenna disposed inside the housing, and
wherein the first opening is covered with a member through which a radio wave passes more easily than the housing.

6. The wireless communication device according to claim 5, wherein the member covering the first opening is a grip to hold the wireless communication device.

7. The wireless communication device according to claim 1,
wherein the housing has a second opening formed near the second antenna disposed inside the housing, and
wherein the second opening is covered with a member through which a radio wave passes more easily than the housing.

8. The wireless communication device according to claim 7, wherein the member covering the second opening is a cover to protect an electronic connection terminal held by the housing.

9. The wireless communication device according to claim 1, wherein the second antenna is at least one of an antenna pattern printed on a circuit board, a chip antenna that is implemented on a circuit board, and an antenna pattern printed on a resin component of the housing.

10. A method carried out by a wireless communication device, the wireless communication device including:
a wireless communication device including a housing configured to hold a wireless communication controller;
a first antenna disposed inside the housing and coupled to the wireless communication controller, the first antenna having a low electric field intensity in some of directions departing from the wireless communication device due to attenuation or blockage of radio wave by the housing; and
a second antenna disposed inside the housing and coupled to the wireless communication controller, the second antenna having higher electric field intensity than the first antenna in a strength-declining direction where the first antenna has a lowest electric field intensity,
wherein the second antenna comprises a relay antenna configured to exchange a radio wave with the first antenna, and an antenna coupled to the relay antenna to exchange a radio wave with an external device,
the method comprising:
exchanging radio waves with an external device using both the first antenna and the second antenna, the first antenna and the second antenna being controlled by the wireless communication controller.

11. A wireless communication device comprising:
a housing configured to hold a wireless communication controller;
a first antenna disposed inside the housing and coupled to the wireless communication controller, the first antenna having low electric field intensity in some of directions departing from the wireless communication device due to attenuation or blockage of radio wave by the housing; and
a second antenna coupled to the wireless communication controller, the second antenna having higher electric field intensity than the first antenna in a strength-declining direction where the first antenna has lowest electric field intensity,
wherein the second antenna comprises a relay antenna capacitively-coupled to the first antenna, and an antenna coupled to the relay antenna to exchange a radio wave with an external device, and
the second antenna is coupled to the wireless communication controller through the first antenna.

* * * * *